June 9, 1959 J. ZAWELS 2,890,418

NON-LINEAR SEMI-CONDUCTOR SIGNAL TRANSLATING CIRCUITS

Filed Sept. 18, 1953

INVENTOR.
JAKOB ZAWELS

BY H. L. Newton

ATTORNEY 2,890,418

NON-LINEAR SEMI-CONDUCTOR SIGNAL TRANSLATING CIRCUITS

Jakob Zawels, Collingswood, N.J., assignor to Radio Corporation of America, a corporation of Delaware Application September 18, 1953, Serial No. 381,057
15 Claims. (Cl. 332—31)

Figure 1:
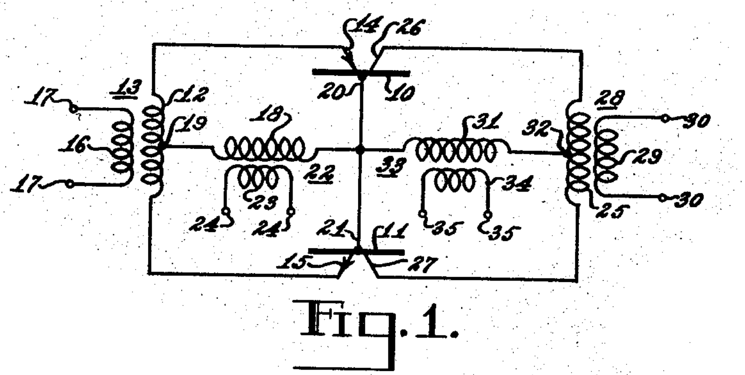

The present invention relates generally to non-linear signal translating circuits and particularly to signal conveying circuits incorporating semi-conductor devices of opposite conductivity type adapted to produce non-linear translating functions.

A complete system for conveying intelligence from one point to another by means of carrier wave energy requires that the carrier wave be modified or modulated at the transmitting point in accordance with the intelligence and that the intelligence be extracted from the carrier wave energy by demodulation or detection at the receiving point.

In order to provide the functions of modulation and demodulation it is required that non-linear devices and circuits be utilized as is well known by those skilled in the art.

One method of providing modulation of a carrier wave while conserving power or band width has included the use of vacuum tube modulators of the balanced type provided with a pair of electron discharge devices in a symmetrical or balanced circuit arrangement. Such symmetrical circuits have been utilized to reduce distortion or other undesirable operating characteristics. For example, this type of circuit inherently operates to eliminate many of the undesirable intermodulation products. A further advantage in the use of symmetrical or balanced circuits is the marked reduction in overall distortion attained thereby.

Semi-conductor devices such as transistors can, of course, be adapted to similar circuits. However, in the field of semi-conductor devices in contradistinction to the field of electron discharge devices, there are opposite conductivity types or complementary symmetry types as described by George C. Sziklai in the "Proceedings of the I.R.E.," June 1953, pages 717–724.

Accordingly it is an object of the present invention to provide a balanced non-linear signal translating circuit utilizing a pair of semi-conductor devices of the opposite conductivity type.

It is a further object of the present invention to provide a simple non-linear signal translating circuit utilizing at least a pair of semi-conductor devices of opposite conductivity type in a symmetrical or balanced arrangement.

It is a still further object of the present invention to provide a simple balanced signal modulator circuit utilizing at least a pair of semi-conductor devices of the opposite conductivity type.

It is another object of the present invention to provide a simple balanced signal demodulator circuit utilizing at least a pair of semi-conductor devices of the opposite conductivity type.

In accordance with one aspect of the present invention, a pair of semi-conductor devices of opposite conductivity type are arranged in a symmetrical circuit wherein a carrier wave signal and a modulating wave signal may be applied in series or in push-pull between similar electrodes of the pair of semi-conductor devices and an output signal may be derived from a circuit element connected in series or in push-pull with the respective similar electrodes of the pair of semi-conductor devices depending on the characteristics of the output signal desired.

In accordance with a further aspect of the present invention, a pair of semi-conductor devices of the opposite conductivity point contact type are arranged in a symmetrical circuit and provided with a common tank circuit connected between the respective base electrodes thereof. Accordingly it is readily seen that these semi-conductor devices will constitute an oscillator circuit and will thereby provide a locally generated signal. An input signal which may be a modulated carrier wave may then be applied in phase to the respective similar input electrodes of the pair of semi-conductor devices and an output signal representing the intermodulation products may be derived from a circuit connected in common between the respective similar output electrodes of the pair of semi-conductor devices and a center tap on the oscillator tank circuit.

Figure 2:
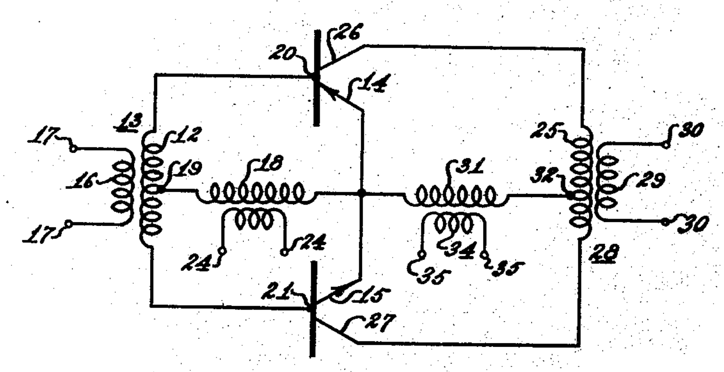
Figure 3:
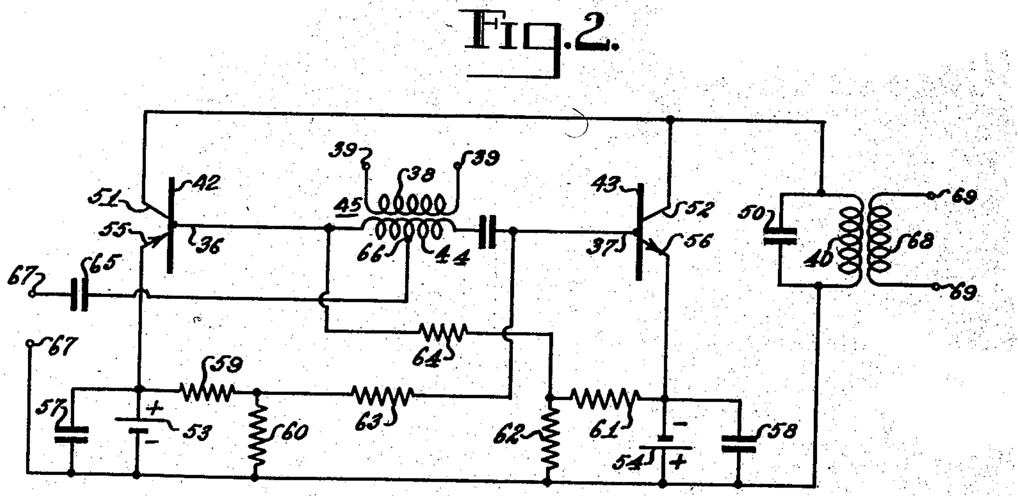

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1 is a schematic circuit diagram of a signal translating circuit including a pair of semi-conductor devices arranged in symmetrical or balanced relation in accordance with the present invention to provide a non-linear function;

Figure 2 is a schematic circuit diagram of a non-linear signal translating circuit embodying the invention, as a modification of that illustrated in Figure 1; and Figure 3 is a schematic circuit diagram of a signal translating circuit including a pair of semi-conductor devices of opposite conductivity type arranged in a symmetrical circuit and including resistance coupling in accordance with the present invention.

Referring now to Figure 1, a pair of junction transistors 10 and 11 of opposite conductivity type, are arranged in symmetrical or balanced relation illustrating only the alternating current circuit aspects of a balanced signal conveying or translating circuit in accordance with the present invention.

It is, of course, to be understood that transistors of opposite conductivity type may comprise a pair of junction transistors with one of the transistors being of the N–P–N type and the other being of the P–N–P type or the pair of transistors may comprise two point contact transistors, one having a semiconductive body of N-type material and the other having a semiconductive body of P-type material. Further, other semi-conductor devices which exhibit the characteristics necessary for the proper operation of the circuit in accordance with the present invention may be utilized without departing from the scope of the present invention.

Accordingly an inductor 12, which may be provided by the secondary winding of an input transformer 13 is connected between the emitter electrodes 14 and 15. The input transformer 13 may also include a primary winding 16 provided with a pair of input terminals 17 to which any convenient source of alternating current signal energy, such as a source of carrier wave energy as will be more fully hereinafter described, may be connected.

In order to complete the input circuit of the semi-conductor devices, a second inductor 18 is connected between a center tap 19 on the inductor 12 and the base electrodes 20 and 21. The second inductor 18 may also comprise the secondary winding of a second input transformer 22 further including a primary winding 23 which may also be provided with a second pair of input terminals 24 to which the second source of alternating current signal energy such as a modulation wave, as will be more fully hereinafter described, may be connected.

The collector electrode circuit of the semi-conductor devices 10 and 11 includes an inductor 25 connected between the collector electrodes 26 and 27. The output inductor 25 may comprise the primary winding of an output transformer 28 which may also include a secondary winding 29 provided with a pair of output terminals 30. The collector electrode circuit of the semi-conductor devices 10 and 11 further includes a second inductor 31 connected between the center tap 32 on the first inductor 25 and the base electrodes 20 and 21. The second inductor 31 may comprise the primary winding of an output transformer 33 which may also be provided with a secondary winding 34 including a pair of output terminals 35.

It is, of course, to be understood as above mentioned that the schematic circuit diagram of Figure 1 illustrates merely the alternating current aspects of the circuit. In practical application there may be provided a direct current source of energizing or biasing potential as will be more fully discussed in connection with Figure 3.

Before describing the specific operation of the circuit illustrated in Figure 1, some of the fundamental aspects of the operation of semi-conductor devices will be first discussed.

The conversion ability of a semi-conductor device is dependent upon the frequency range to be utilized in the specific embodiment. The output frequency limitations normally imposed on non-linear circuits are the same as the limitations imposed for amplifier circuits. The signal or input frequency range is ultimately limited by the capacitance which shunts the emitter electrode when it is biased in a reverse direction.

The conversion gain of such a circuit influences the noise factor. At low frequencies the semi-conductor device of the junction type equals the performance of a crystal diode followed by a semi-conductor amplifier. At VHF frequencies a conversion gain may still be obtained if point contact semi-conductor devices are utilized. However, at present the noise factor of such devices is higher than that which can be obtained by the combination of the diode and the semi-conductor amplifier.

Of the various semi-conductor device parameters it is found that the emitter electrode resistance has a strong dependence on current bias. That is, the emitter electrode resistance varies considerably with a variation of the current bias which is caused to flow through the emitter electrode junction. This is one non-linearity upon which the frequency conversion ability of semi-conductor devices depends.

If it is assumed that a semi-conductor device is provided with a pair of signal input circuits connected serially between the base electrode and the emitter electrode and further, that the emitter electrode is biased from a constant direct current or voltage source, and that the collector is biased from a constant voltage or current source, the signal energy applied through one of the input circuits will vary the current flowing through the emitter electrode and thereby vary the emitter resistance. This variation of resistance is the non-linearity upon which modulation depends. A modification in the above circuit does not require an externally applied emitter bias as the rectified signal will provide a direct current bias in the emitter.

If it is now assumed that a carrier wave signal is applied at the input terminals 17 and a modulation wave signal is applied to the input terminals 24, and since the modulation wave signal in the example just described is applied in parallel to the emitter electrode 14 and 15 relative to the base electrodes 20 and 21, this modulation wave energy will be superimposed upon the carrier wave energy, and there will appear at the output terminals 30 the carrier wave energy, the second harmonic of the modulation signal energy and the second harmonic of the carrier wave energy. There will also appear at the output terminals 35 the modulation wave energy and the side band energy of the combined modulation signal wave and carrier wave.

It can further be shown mathematically or in a practical demonstration of the circuit illustrated in Figure 1, that the signal and the carrier wave energy may be applied simultaneously to either of the input terminals 17 or 24 and that the carrier wave energy may be applied to the input terminals 24 and the signal energy applied to the input terminals 17. The manner in which these waves are applied to the input terminals will determine in part the modulation products which will appear at the respective output terminals 30 and 35. It can further be shown that the non-linear circuit so provided in accordance with the invention may be employed as a balanced suppressed carrier modulation circuit or as a balanced suppressed local oscillation mixer or as modulators and mixers without suppression of the carrier on local oscillation. Further, when only one input signal is utilized, the circuit is capable of acting as a second detector.

The circuit illustrated in Figure 2 differs from the circuit above discussed in connection with Figure 1 in that a common emitter electrode connection is utilized in place of the common base electrode connection illustrated in Figure 1. The circuits of either Figure 1 or Figure 2 may be chosen, depending upon the impedance level desired for the input circuits as is well known in the transistor or semi-conductor art. It is further evident that either of these circuits may be employed in a non-linear manner such as discussed above in connection with Figure 1.

In the event that a common ground connection is desired for a bias battery in the collector electrode circuit the signal generator which would normally be connected between the center tap 19 and the junction of the two emitter electrodes 14 and 15 can be inserted between the base electrode 21 and the collector electrode 27 or the emitter electrode 15 and the collector electrode 27 resulting in only a small loss of signal power in the collector electrode circuit.

Referring now to Figure 3 a pair of semi-conductor devices 42 and 43 are arranged in a symmetrical non-linear circuit in accordance with the present invention, which illustrates a practical embodiment including direct current static bias for the semi-conductor devices. Accordingly an input inductor 44 which may comprise the secondary winding of an input transformer 45 is connected between the base electrodes 36 and 37. The input transformer 45 may further include a primary winding 38 provided with a pair of input terminals 39 to which a source of signal wave energy may be connected.

The output circuit comprises a parallel resonant tuned circuit including an inductor 40 and a capacitor 50 connected in common between the collector electrodes 51 and 52 and a point of fixed reference potential such as chassis ground.

Direct current bias potential to provide a static bias for the semi-conductor devices 42 and 43 may be applied from any convenient direct current voltage source which is illustrated as a pair of batteries 53 and 54 connected repsectively between the emitter electrodes 55 and 56 and ground. Each of the batteries 53 and 54 may be bypassed at signal frequencies by the respective capacitors 57 and 58.

In order to provide a static bias of proper polarity, between the respective base electrodes 36 and 37 and their respective emitter electrodes 55 and 56, each of the two batteries 53 and 54 is provided with a voltage divider network comprising a pair of resistors 59, 60 and 61 and 62. The junction of the voltage dividing resistors 59 and 60 is connected through a high impedance resistor 63 to the base electrode 37 and the junction of the voltage dividing resistors 61 and 62 is connected to another high impedance resistor 64 to the base electrode 36. In this manner a substantially constant current direct current bias is applied to the base electrode circuits of each of the two semi-conductor devices 42 and 43.

An input circuit for a second source of signal wave energy may be provided by means of an input capacitor 65 connected between a center tap 66 on the input inductor 44 and one of a pair of input terminals 67. The other terminal of the pair of input terminals 67 may be connected to ground.

An output signal may be obtained from an output inductor 68 which is inductively coupled with the inductor 40 and provided with a pair of output terminals 69. The character of the output signal so obtained, of course, will depend upon the arrangement of the input signals as described above in connection with Figure 1.

The operation of the circuit of Figure 3 is substantially identical with the operation of the circuits illustrated in Figures 1 and 2 with the exception that in Figure 3 a static direct current bias exists in the emitter-base electrode circuits to assure non-linear operation in the most desirable region. Accordingly it can be seen that if a carrier wave is applied at the input terminals 67 and a modulation signal wave is applied at the input terminals 38, the carrier wave and the side band energy may be selected by the parallel resonant circuit comprising the capacitor 50 and the inductor 40. If the modulation signal wave is applied at the input terminals 67 and the carrier wave is applied at the input terminals 38, the modulation signal or either of the side bands may be selected by the parallel resonant circuit. If both the carrier wave and the modulation signal wave are simultaneously applied to the input terminals 67, either of them may be selected by the parallel resonant circuit and as above described in connection with Figure 1, the first order modulation products will not appear at the output terminals.

It is thus seen that the present invention provides a simple circuit employing semi-conductor devices of opposite conductivity type to provide non-linear functions. The circuit may be utilized as a balanced modulator or demodulator depending on the character of and the manner of the application of the input waves and the output signals may be derived in series or in parallel with the output electrodes of the semi-conductor device depending on the character of the output signal desired.

What is claimed is:

1. The combination comprising a pair of semi-conductor devices of opposite conductivity type each having first, second and third electrodes; like numbered electrodes of said devices being alike in function; means adapted to impress a first signal wave serially between said first electrodes; means adapted to impress a second signal wave between each of said first electrodes and the respective second electrode; and means for deriving an output signal from said third electrodes.

2. In a signal translating circuit, the combination comprising a pair of semi-conductor devices of opposite conductivity type each having first, second and third electrodes; like numbered electrodes of said devices being alike in function; means adapted to impress a first signal wave between said first electrodes; means adapted to impress a second signal wave between each of said first electrodes and the respective second electrode whereby signal rectification provides a bias for said device to produce non-linear operation of said devices thereby to mix said signals; and means for deriving an output signal from said third electrodes.

3. The combination comprising a pair of semi-conductor devices of opposite conductivity type each having first, second and third electrodes; like numbered electrodes of said devices being alike in function; means connected for biasing said third electrodes in a reverse direction; means adapted to impress a first signal wave between said first electrodes; the amplitude of said first signal wave being relatively large whereby signal rectification establishes a forward bias condition at said first electrodes to provide non-linear operation of said devices; means adapted to impress a second signal wave between each of said first electrodes and the respective third electrode whereby said signals are mixed; and means for deriving an output signal having a predetermined characteristic from said second electrodes.

4. The combination comprising a pair of semi-conductor devices of opposite conductivity type each having first, second and third electrodes; a like numbered electrodes of said devices being alike in function; means providing a first input circuit connected between said first electrodes for applying a first input signal in phase opposition therebetween; means including an input coupling inductive element providing a second input circuit connected in common between said first electrodes and their respective second electrodes for applying a second input signal in phase therebetween; and means providing an output circuit comprising a parallel resonant tuned circuit connected between said third electrodes and said second electrodes.

5. In a non-linear signal translating circuit, the combination comprising a pair of semi-conductor devices of opposite conductivity type each having first, second and third electrodes; like numbered electrodes of said devices being alike in function; a source of direct current connected for biasing said output electrode in a reverse direction; a first input circuit connected between said first electrodes for applying a first input signal in phase opposition therebetween; a second input circuit connected in common between said first electrodes and their respective third electrodes for applying a second input signal in phase therebetween whereby signal rectification provides a bias for said device to produce non-linear operation of said devices thereby to mix said signals; and an output circuit connected in common between each of said second electrodes and their respective third electrodes.

6. In a non-linear signal translating circuit, the combination comprising a pair of semi-conductor devices of opposite conductivity type each having emitter, collector and base electrodes; said base electrodes being directly connected together; a first input circuit connected between said emitter electrodes for applying a modulation wave signal in phase opposition therebetween; a second input circuit connected in common between said emitter electrodes and said base electrodes for applying a carrier wave signal in phase therebetween; and an output circuit being resonant at the frequency of said carrier wave signal and connected between said collector electrodes and said base electrodes.

7. In a symmetrical non-linear circuit, the combination comprising a pair of semi-conductor devices of opposite conductivity type each having first, second and third electrodes; like numbered electrodes of said devices being alike in function; a first input circuit adapted to impress a first input signal in phase opposition between said first electrodes; a second input circuit adapted to impress a second input signal in the same phase upon said first electrodes; a first output circuit coupled serially with said second electrodes; and a second output circuit coupled in common between each of said second electrodes and the respective third electrode, whereby said output signals exhibit the characteristics of said input signals and the intermodulation products thereof.

8. In a symmetrical non-linear circuit, the combination comprising a pair of semi-conductor devices of opposite conductivity type each having emitter, collector and base electrodes; a source of direct current connected for applying a reverse bias to said collector electrode; a first input circuit adapted to impress a first input signal in phase opposition between said emitter electrodes; a second input circuit adapted to impress a second input signal in the same phase upon said emitter electrodes; a first output circuit coupled serially with said collector electrodes; and a second output circuit coupled in common with said collector electrodes and said base electrodes, whereby said output signals exhibit the characteristics of said input signals and the intermodulation products thereof.

9. In a symmetrical non-linear circuit, the combination comprising a pair of semi-conductor devices of opposite conductivity type each having emitter, collector and base electrodes; means connected for applying a reverse bias between said collector electrodes and their respective base electrodes; a first input circuit adapted to impress a first input signal in phase opposition between said base electrodes; a second input circuit adapted to impress a second input signal in the same phase upon said base electrodes; a first output circuit coupled serially with said collector electrodes; and a second output circuit coupled in common with said collector electrodes and said emitter electrodes, whereby said output signals exhibit the characteristics of said input signals and the intermodulation products thereof.

10. The combination comprising a pair of semi-conductor devices each having first, second and third electrodes; like numbered electrodes of said devices being alike in function; a first input circuit coupled serially between said first electrodes for impressing a first input signal in phase opposition therebetween; a second input circuit coupled in common between said first electrodes and the respective third electrodes for impressing a second input signal in the same phase therebetween; a first output circuit coupled serially with said second electrodes; and a second output circuit coupled in common with said second electrodes and said third electrodes, whereby said output signals exhibit the characteristics of said input signals and the intermodulation products thereof.

11. In a signal translating circuit, the combination comprising a pair of semi-conductor devices each having base, collector and emitter electrodes; a first input circuit connected serially between said base electrodes for impressing a first input signal in phase opposition therebetween; a second input circuit connected in common between said base electrodes and the respective emitter electrodes for impressing a second input signal in the same phase therebetween; a first output circuit connected serially with said collector electrodes; and a second output circuit connected in common with said collector electrodes and said emitter electrodes, whereby said output signals exhibit the characteristics of said input signals and the intermodulation products thereof.

12. In a signal translating circuit, the combination comprising a pair of semi-conductor devices each having emitter, collector and base electrodes; a first input circuit including a first inductor connected serially between said base electrodes for impressing a first input signal in phase opposition therebetween; a second input circuit including a second inductor coupled in common between said base electrodes and the respective emitter electrodes for impressing a second input signal in the same phase therebetween; a first output circuit including a first impedance element connected serially with said collector electrodes; and a second output circuit including a second impedance element coupled in common with said collector electrodes and said emitter electrodes, whereby said output signals exhibit the characteristics of said input signals and the intermodulation products thereof.

13. In a signal translating circuit, the combination comprising a pair of semi-conductor devices of opposite conductivity type each including an emitter junction and a collector junction and having base, collector and emitter electrodes; means including a source of direct current bias for providing a reverse bias across each of said collector junctions and for providing a bias across each of said emitter junctions; an input circuit including a first impedance element connected serially between said base electrodes to provide a first input signal in phase opposition therebetween and including a center tap; a second input circuit connected between said center tap and each of said emitter electrodes for providing a second input signal of the same phase between each of said base electrodes and their respective emitter electrodes; and an output circuit connected in common between said collector electrodes and said emitter electrodes for deriving therefrom an output signal having the combined characteristics of said output signals.

14. In a signal translating circuit, the combination comprising a pair of semi-conductor devices of opposite conductivity type each having base, collector and emitter electrodes; means including a source of direct current bias for providing a reverse bias between each of said collector electrodes and their respective base electrodes and for providing a bias between each of said emitter electrodes and their respective base electrodes; an input inductor connected serially between said base electrodes to provide a first input signal in phase opposition therebetween and including a center tap; an input means connected between said center tap and each of said emitter electrodes for providing a second input signal of the same phase between each of said base electrodes and their respective emitter electrodes; a first output circuit connected in common between said collector and emitter electrodes for deriving an output signal having the characteristics of said input signals.

15. The combination comprising a pair of semi-conductor devices of opposite conductivity type each having emitter, collector and base electrodes; means including a source of direct current bias for providing a reverse bias for each of said collector electrodes and for providing a forward bias for each of said emitter electrodes; a first input circuit including an inductor connected serially between said base electrodes to provide a first input signal in phase opposition therebetween and including a center tap; a second input circuit connected between said center tap and each of said emitter electrodes for providing a second input signal of the same phase between each of said base electrodes and their respective emitter electrodes; an output circuit including an output inductor connected in common between said collector electrodes and said emitter electrodes for deriving therefrom an output signal having the combined characteristics of said input signals.

References Cited in the file of this patent

UNITED STATES PATENTS

| | | |
|---|---|---|
| 1,343,306 | Carson | June 15, 1920 |
| 2,101,438 | Lindenblad | Dec. 7, 1937 |
| 2,171,151 | Urtel | Aug. 29, 1939 |
| 2,429,755 | Hallmark | Oct. 28, 1947 |
| 2,486,776 | Barney | Nov. 1, 1949 |
| 2,666,819 | Raisbeck | Jan. 19, 1954 |
| 2,713,665 | Raisbeck et al. | July 19, 1955 |
| 2,762,870 | Sziklai et al. | Sept. 11, 1956 |
| 2,791,644 | Sziklai | May 7, 1957 |